Dec. 9, 1930.  A. L. ALLEN  1,784,327
MOWING MACHINE
Filed Dec. 19, 1928  3 Sheets-Sheet 1

Inventor
A. L. Allen
By Clarence A O'Brien
Attorney

Dec. 9, 1930. A. L. ALLEN 1,784,327
MOWING MACHINE
Filed Dec. 19, 1928 3 Sheets-Sheet 3
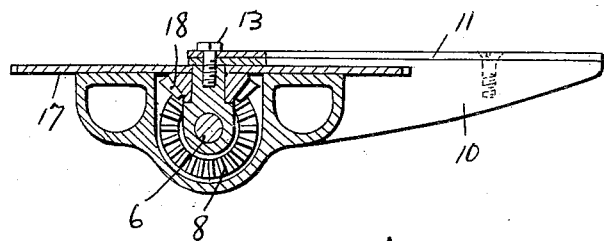
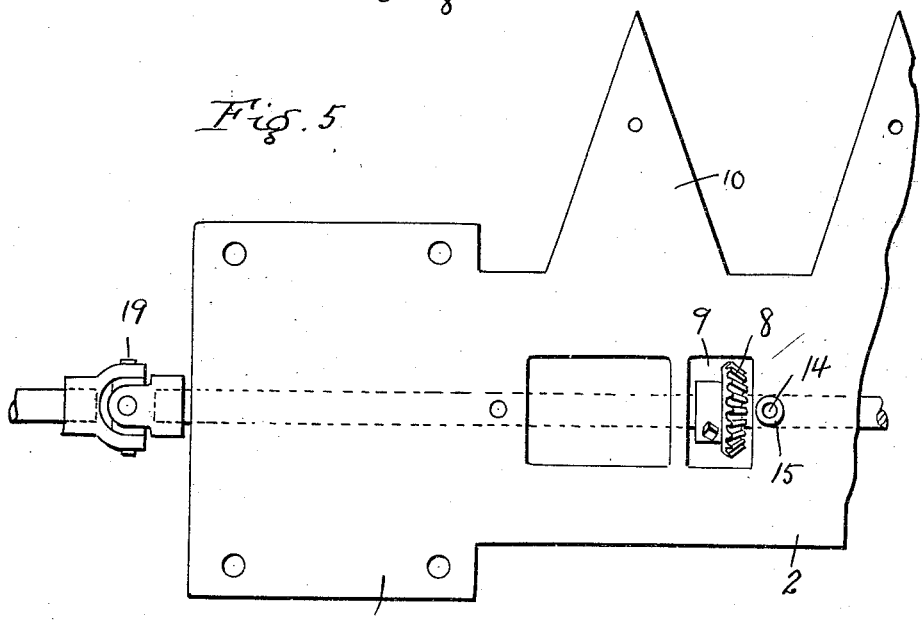
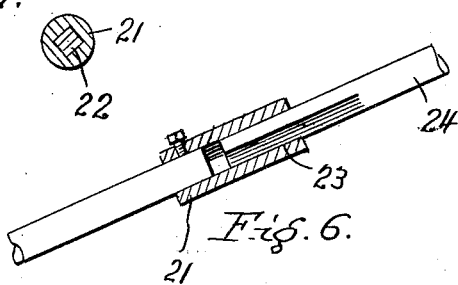
Inventor
A. L. Allen
By Clarence A. O'Brien
Attorney Patented Dec. 9, 1930

1,784,327

UNITED STATES PATENT OFFICE

AMBROSE L. ALLEN, OF MART, TEXAS

MOWING MACHINE

Application filed December 19, 1928. Serial No. 326,985.

The present invention relates to improvements in mowing machines and has for its principal object to provide an improved cutting mechanism for association therewith.

One of the important objects of the present invention is to provide a mowing machine that includes a plurality of gear operated toothed cutting disks, the same being disposed horizontally and also arranged in overlapping relation with respect to each other for cooperation with the respective guard fingers whereby large quantity of material may be cut in a simple and efficient manner.

At the present time most mowing machines employ a reciprocating cutter bar with a pitman for operating the same. It is one of the aims of the present invention to provide a mowing machine wherein the cutting mechanism employs rotary cutting discs and a rotary drive shaft in lieu of the reciprocating cutter mechanism above referred to.

Still a further object is to provide a mowing machine of the above mentioned character wherein the cutting mechanism therefor can be readily and easily assembled or disassembled whenever necessary, said cutting mechanism being further simple in construction, inexpensive, strong and durable and further well adapted to the purpose for which it is designed.

Other objects and advantages of the invention will become apparent from the following description when taken in connection with the accompanying drawings.

In the accompanying drawings wherein like reference characters indicate corresponding parts throughout the same:

Figure 4 is a transverse section taken on the line 4—4 of Figure 2.

Figure 5 is a fragmentary top plan view of the inner enlarged end of the casing showing the driven shaft extending therethrough and the universal connection between one end of the driven shaft and the drive shaft.

Figure 6 is a detail view showing the connection between the adjacent sections of the drive shaft, and Figure 7 is a sectional view through the coupling sleeve shown in Figure 6.

Figure 1:
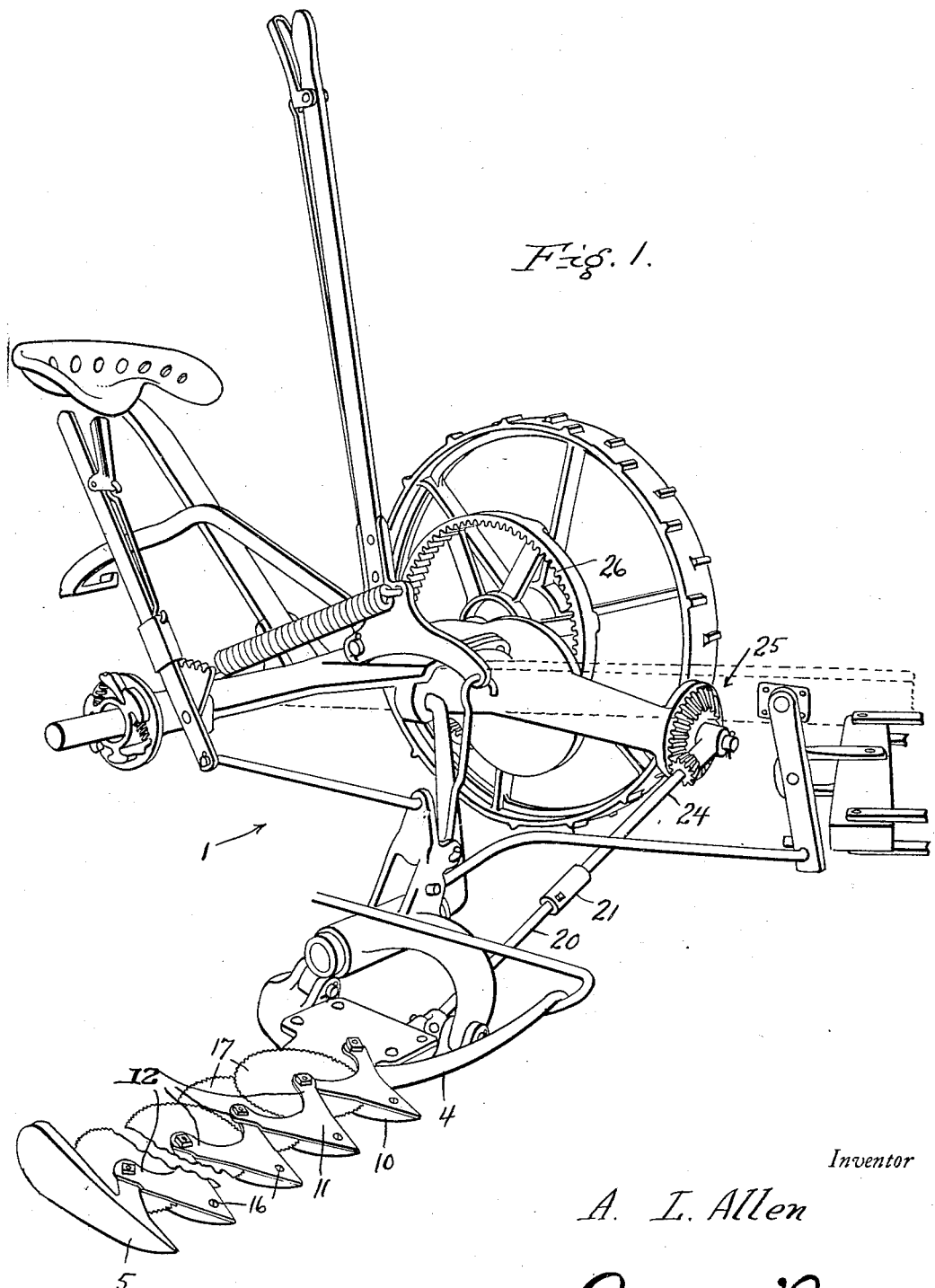
Figure 1 is a detail perspective view of my improved cutting mechanism showing the driving means therefor.

In the drawings wherein for the purpose of illustration is shown the preferred embodiment of my invention, the numeral 1 designates generally a portion of a conventional mowing machine that is of the conventional construction, and with which my improved cutting mechanism is adapted to be associated. The usual cutting mechanism of this type of mowing machine is removed, and my improved cutting mechanism is substituted in lieu thereof.

My improved cutting mechanism includes an elongated casing 2 that is enlarged at its inner end as at 3 for attachment to the inner shoe 4, the outer shoe 5 being associated with the outer end of the casing in any suitable manner.

Extending longitudinally through the casing is the driven shaft 6 and at spaced intervals, the casing is formed with enlarged cavities 7 for accommodating the beveled gears 8 that are secured on the driven shaft for rotation therewith, these beveled gears extending through suitable openings provided in the top of the casing as shown at 9 in Figure 5.

Figure 2:
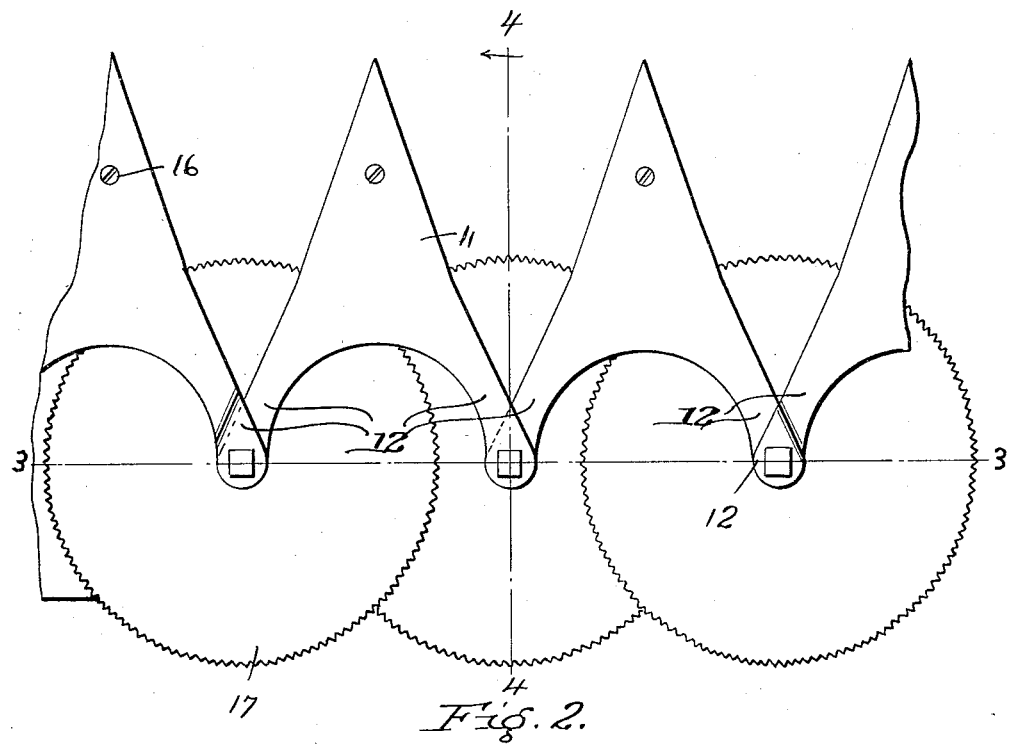
Figure 2 is a fragmentary top plan view of the cutting means for more clearly disclosing the overlapping relation of the toothed cutting disks.
Figure 3:
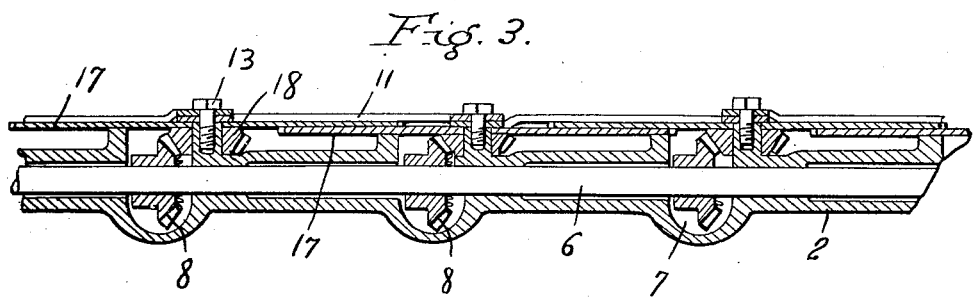
Figure 3 is a longitudinal sectional view taken approximately on the line 3—3 of Figure 2.

Stationary guard fingers 10 of the conventional construction extend forwardly from the casing 2 and suitable cover plates 11 are detachably secured on the upper faces of the respective guard fingers 10, the inner end portion of each cover plate being formed with diverging arms 12 and the arms of the adjacent cover plates are disposed in overlapping relation and are secured together by means of a bolt 13 that is threaded into a suitable socket 14 provided therefor in the upstanding bearing forming pin 15 formed on the top of the casing adjacent the respective cavities as indicated very clearly in Figure 3. The securing means that extends through the forward end portions of the cover plate into the adjacent portions of the guard fingers is shown at 16 in Figures 2 and 4.

The cutting mechanism further includes the provision of a series of toothed cutting disks 17, each of which is formed with a central opening for disposition around the respective bearing pin 15 for rotation therearound.

The cutting discs are arranged horizontally for disposition between the upper face of the casing 2 and the cover plate 11 at the upper faces of the guard fingers 10, it being understood of course that the guard fingers are cut out to accommodate the cutting disks. These cutting disks are also arranged in overlapping relation and a bevel gear 18 is secured to the bottom face of each disc at the central portion thereof to provide a unitary structure. Each of the bevel gears 18 is formed with a circular opening to accommodate the pin 15 and these bevel gears 18 mesh with the bevel gears 8 as clearly indicated in Figure 3.

A sectional drive shaft is operatively connected with the inner end of the driven shaft 6 by means of a universal joint shown generally at 19 in Figure 5. The outer section 20 of the drive shaft has secured on its inner end a sleeve 21 that is formed with the rectangular shaped bore 22 to accommodate the square inner end 23 of the inner section 24 of the drive shaft whereby said drive shaft may be longitudinally adjusted.

The inner end of the sectional drive shaft is in turn operatively connected with the driving mechanism denoted generally by the numeral 25 which in turn is controlled by the traction wheel ring gear 26 in the manner well known in the art.

In the operation of the mowing machine, the driven shaft 6 will be rotated by the rotation of the drive shaft 20 and the gears 8 secured on the driven shaft will in turn cooperate with the beveled gears 18 for simultaneously rotating the cutting discs 17 and the toothed cutting edges of these discs will cooperate with the stationary guard fingers to cut large quantity of grain, sugar cane and the like in a positive and efficient manner.

A cutting mechanism of this character may be readily and easily assembled or disassembled, and furthermore the same can be operated in a simple and efficient manner.

While I have shown the preferred embodiment of my invention it is to be understood that minor changes in the size, shape and arrangement of parts may be resorted to without departing from the spirit of the invention and the scope of the appended claims.

Having thus described the invention, what I claim as new and desire to secure by Letters Patent is:—

1. In a cutting mechanism for harvesters or the like comprising a casing, stationary guard fingers extending forwardly therefrom, a driven shaft extending longitudinally of the casing, a series of horizontally disposed overlapping cutting disks mounted for rotation on the casing and extending beyond the forward side thereof for cooperation with the respective guard fingers, cover plates for the guard fingers and the upper forward portions of the cutting disks, intermeshing bevel gears arranged on the drive shaft and the respective cutting disks whereby said disks will rotate simultaneously, and means for actuating the driven shaft.

2. In a cutting mechanism for mowing machines, an elongated casing formed with spaced cavities, a driven shaft mounted for rotation in the casing and extending longitudinally therethrough, stationary guard fingers extending forwardly from the casing, cover plates for the upper faces of the guard fingers, the inner ends of the cover plates terminating in diverging arms, the arms of the adjacent cover plates being secured together in overlapping relation on the casing, horizontally disposed toothed cutting discs arranged for rotation on the casing between the adjacent guard fingers and underlying the cover plates, said cutting discs being disposed in overlapping relation with respect to each other, beveled gears secured on the driven shaft and disposed within said cavities, beveled gears secured on the under faces of the cutting disks for meshing engagement with the respective beveled gears on the driven shaft whereby said cutting disks are rotated simultaneously, and means for rotating the driven shaft.

3. In a cutting mechanism for mowing machines, an elongated casing formed with spaced cavities, integral vertical journal pins formed in the casing adjacent the cavities, and having threaded bores, a driven shaft mounted for rotation in the casing and extending longitudinally therethrough, stationary guard fingers extending forwardly from the casing, cover plates for the upper faces of the guard fingers, the inner ends of the cover plates terminating in diverging arms the free ends of which are mounted on top of the journal pins in overlapping relation, a securing bolt extending through said arms and threaded into the journal pins for securing the arms thereto, horizontally disposed toothed cutting disks arranged for rotation on the journal pins between the adjacent guard fingers and underlying the cover plates, said cutting disks being disposed in overlapping relation with respect to each other, beveled gears secured on the driven shaft and disposed within said cavities, beveled gears secured on the under faces of the cutting disks and journaled on the pins for meshing engagement with the respective bevel gears on the driven shaft whereby said cutting disks are rotated simultaneously and means for rotating the driven shaft.

In testimony whereof I affix my signature.

AMBROSE L. ALLEN.